Patented June 22, 1954

2,681,930

UNITED STATES PATENT OFFICE 2,681,930

MANUFACTURE OF UREA

Raymond A. Franz, El Dorado, Ark., assignor to Lion Oil Company, El Dorado, Ark., a corporation of Delaware No Drawing. Application July 27, 1953,
Serial No. 370,605

18 Claims. (Cl. 260—555)

This invention relates to an improved process of producing urea, and more particularly to the production of urea from carbonyl sulfide and ammonia.

Unless otherwise specified herein, yields of urea are given as per cent by weight and are based on (a) carbon dioxide or carbonyl sulfide, (b) urea of 100% purity, and (c) on the reactants being passed through the reaction zone only once (i. e. no urea resulting from recycle is included in the yields, nor is recycling necessary in the present invention). By "excess" and "substantial excess" of ammonia as used herein is meant that the quantity of ammonia involved is more than the stoichiometric requirement. Preferably the ammonia is employed as about 10%–30% solution, by weight, in methanol and at a ratio of at least about three mols ammonia to one mol carbonyl sulfide. "Mixture" as used herein is intended to include a solution as well as a slurry. While it is much preferred and contemplated that this invention will be carried out under conditions as herein disclosed, such that no slurry is involved during the reaction of carbonyl sulfide and ammonia, it is within the scope of this invention to have a slurry at this point, e. g. the relative amount of methanol to ammonium thiocarbamate formed could be such that some of the latter would not dissolve in the methanol.

One conventional process of manufacturing urea involves subjecting a mixture of carbon dioxide and ammonia to an elevated pressure and temperature. There are a number of modifications to this so-called carbon dioxide process, but only two of these are in commercial use today. The conditions vary from 180° C. and 3000 p. s. i. to 210° C. and 6000 p. s. i. and up to 250% excess ammonia above the stoichiometric requirement, the yields of urea under these conditions varying from 40% to 50%. The art states that while higher yields per pass can be obtained, it is impractical. Although the carbon dioxide process has been in commercial use for a number of years, it has its drawbacks. One serious drawback is that the cost of building and operating the plant is very high because of the high pressure required. An additional drawback is that the yields are undesirably low.

Another conventional process of producing urea comprises subjecting a mixture of carbonyl sulfide and ammonia to a pressure of 300–500 p. s. i. and a temperature of 110° C.–120° C. Under these conditions an intermediate product, ammonium thiocarbamate, forms as a precipitate and is converted to urea. Although yields up to approximately 70% urea are reported for this so-called carbonyl sulfide process, the art has not developed the process beyond a very small laboratory scale. Likewise one major difficulty with this process is the high pressure required. Because the ammonium thiocarbamate is in a solid state, another difficulty involves handling it. A further difficulty is that at least one and preferably both of the reactants must be liquefied in order to accelerate the reaction.

An object of this invention is to provide an improved process of producing urea. A further object is to provide an improved process of producing urea from carbonyl sulfide and ammonia. A still further object is to overcome the drawbacks of the prior art. Another object is to provide such a process by which, as compared with the best known prior art processes, substantially higher yields of urea can be produced under substantially lower conditions of pressure and temperature. The above and other objects will be apparent from the description of this invention given hereinafter.

I have found by employing methanol that the ammonium thiocarbamate dissolves therein as fast as formed and thereby greatly improves the process from an engineering or handling standpoint. The use of methanol is also advantageous in other respects, as is disclosed hereinafter. In addition I have found that, as compared with the art, a marked increase in yield of urea is obtained under lower pressure and temperature.

The above objects are accomplished according to the present invention broadly by reacting together carbonyl sulfide and ammonia in the presence of methanol, heating the resulting mixture at a urea-forming temperature but below the temperature at which urea substantially decomposes, and then removing the methanol. More specifically the reaction desirably is carried out employing an excess of ammonia, and preferably the carbonyl sulfide and ammonia are initially in the gaseous state. In carrying out the reaction it is likewise desirable to introduce ammonia gas into methanol and add carbonyl sulfide to the ammonia-methanol mixture.

In practicing this invention according to a preferred embodiment thereof, ammonia gas is mixed with anhydrous methanol and with the resulting solution is mixed carbonyl sulfide gas, the molar ratio of ammonia to carbonyl sulfide being greater than about 3 to 1. Thus at room temperature the intermediate product, ammonium thiocarbamate, is formed almost instantaneously. The ammonium thiocarbamate is converted to urea by subjecting in a closed system the mixture thus formed to a temperature of 80° C.–120° C. and the autogenous pressure developed until the reaction is substantially complete. Then the methanol is removed, e. g. by distillation. During the distillation of the methanol the ammonia and sulfur values are also driven off and may be recovered, thus leaving the urea behind. The distillation may be continued to the point at which urea crystallizes from solution or the mixture may be completely evaporated to dryness and the urea crystallized from fresh methanol.

While it is preferable to operate this invention under the above conditions, it will be seen from the examples given hereinafter that conditions outside these are also contemplated. The examples show the use of temperatures of 40° C.–140° C. and a ratio of 1.84–39.0 mols ammonia per mol of carbonyl sulfide. Also the examples show that the invention can be practiced in an open system, in which event the pressure is substantially atmospheric.

Although other means may be employed, the following give good results in recovering the ammonia and sulfur values. The escaping gases from the methanol distillation are cooled to precipitate therefrom the ammonium bisulfide mentioned below. The excess ammonia gas is thus separated for re-use. The ammonium bisulfide is warmed and passed through sulfuric acid, forming ammonium sulfate and allowing the hydrogen sulfide gas to bubble on through. The sulfur value then is recovered from the hydrogen sulfide by known methods, e. g. by partial oxidation thereof.

The following examples illustrate a plurality of specific embodiments of this invention. The yield of urea, in per cent by weight based on COS charged, was determined by the well known Urease method. Allowance was made for the ammoniacal nitrogen, which was determined by the formaldehyde method given in A. O. A. C., seventh edition, 1950, page 14, paragraph 2.28.

EXAMPLE 1

In carrying out these runs at atmospheric pressure, ammonia gas was passed into anhydrous methanol and then carbonyl sulfide gas was mixed into the resulting solution. This portion of the reaction, in which ammonium thiocarbamate forms and dissolves in the methanol as fast as formed, was carried out at room temperature using the quantities of materials shown in Table 1 below. The final solution was heated at a temperature of about 63° C.–65° C. until substantially all of the methanol was distilled. The urea was recovered from the distillation residue and then analyzed in order to determine the yield.

*Table 1*

| Run No. | Mol Ratio NH3/COS | Mols NH3 per Liter Methanol | Temp., °C. | Pressure | Urea, Percent Yield |
|---|---|---|---|---|---|
| 1 | 6.9 | 3.6 | 63–65 | Atmospheric | 46.4 |
| 2 | 39.0 | 6.6 | 63–65 | ...do... | 52.7 |

EXAMPLE 2

In these runs, the ammonium thiocarbamate intermediate was formed under the same condition as in Example 1 above using the quantities of materials shown in Table 2 below. The final solution was heated in a closed vessel under the conditions shown to convert the ammonium thiocarbamate to urea. At the end of each run, the pressure was released from the reactor and the methanol distilled from the mixture and recovered for re-use. The urea was recovered from the distillation residue and then analyzed in order to determine the yield.

*Table 2*

| Run No. | Mol Ratio NH3/COS | Mols NH3 per Liter | Time in Hours | Temp., °C. | Autogenous Pressure, p. s. i. | Urea, Percent Yield |
|---|---|---|---|---|---|---|
| 1 | 6.64 | 18.4 | 16 | 40 | 25 | 16.7 |
| 2 | 11.8 | 8.1 | 1 | 60 | 40 | 76.1 |
| 3 | 11.8 | 8.1 | 3 | 60 | 45 | 87.7 |
| 4 | 1.84 | 7.5 | 3 | 80 | 154 | 64.8 |
| 5 | 2.74 | 11.6 | 3 | 80 | 139 | 83.8 |
| 6 | 4.94 | 16.5 | 3 | 80 | --- | 89.4 |
| 7 | 5.3 | 17.7 | 3 | 80 | 77 | 99.0 |
| 8 | 5.79 | 20.6 | 3 | 80 | --- | 100.0 |
| 9 | 5.2 | 19.2 | 1 | 100 | 172 | 100.0 |
| 10 | 5.53 | 18.1 | 1 | 103–120 | 175 | 95.3 |
| 11 | 5.6 | 14.1 | 1 | 125 | 185 | 98.7 |
| 12 | 5.4 | 15.1 | 0.25 | 140 | 260 | 100.0 |

A number of advantages of this invention are clearly shown by the data in the above examples. Good yields are obtained at only atmospheric pressure and very mild temperatures even with relatively low ratios of ammonia to carbonyl sulfide, the low ratios reducing the amount of ammonia to be recovered for re-use. In fact, practically theoretical yields are obtained under substantially less drastic conditions than the pressure and temperature disclosed in the art. Furthermore, these high yields are obtained in only a single pass of the reactants through the reaction zone.

Although the present invention has been described with reference to specific embodiments thereof, it will be understood by those skilled in the art that many of the conditions appearing hereinbefore may be varied without departing from the spirit and scope of the invention. The invention is readily adaptable to either a batch process, a semi-continuous process or a continuous process. While, for the sake of clarity and simplicity, the invention has been described with reference to carrying out the ammonium thiocarbamate-forming reaction at room temperature (about 20° C.), lower or higher temperatures can be employed. Although it would not appear advantageous to reduce this temperature, under certain circumstances one may desire to recycle the methanol and the excess ammonia at a temperature just below the boiling point of methanol.

Although the mechanism of the reaction according to this invention is not definitely known, there is evidence to support the following theory and it is presented for what aid it may be in understanding the invention and not as a limitation thereof.

The following reactions are thought to be involved.

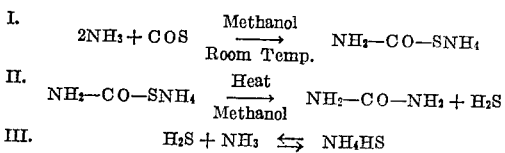

Equations I and II illustrate the main reactions producing urea. First, the intermediate material, ammonium thiocarbamate, is produced (Equation I) and then urea and hydrogen sulfide are produced on heating (Equation II). The use of an excess of ammonia increases the yield of urea. Two reasons are advanced to account for this. First, the excess of ammonia tends to drive the reaction to completion and thus favors a high yield of ammonium thiocarbamate (Equation I) according to the law of mass action. Second, the excess of ammonia tends to drive the reaction to completion by virtue of removing one of the products (hydrogen sulfide in Equation II) of the reaction (which otherwise would tend to reverse the reaction) and thus favors a high yield of urea.

It is believed that the use of a closed system (autogenous pressure) in converting the ammonium thiocarbamate to urea, as shown in Equation II, further increases the yield of urea for two reasons. First, the excess ammonia is not allowed to escape the reaction zone, which results in maintaining excess ammonia in the reactor at all times. The advantage of this is explained in the immediately preceding paragraph. Second, increased pressure promotes Reaction III which tends to make Reaction II go to completion by virtue of removing one of the reaction products therefrom.

Further theorizing, it is thought that methanol serves four purposes. First, it serves as a solvent for the ammonium thiocarbamate (Equation I). Second, it tends to maintain the equilibrium in Equation III in the form of ammonium bisulfide. Third, the methanol tends to reduce the pressure developed while converting the ammonium thiocarbamate to urea. Fourth, the methanol stabilizes the ammonium bisulfide against decomposition.

As many apparently widely different embodiments of this invention may be made without departing from the spirit and scope thereof, it is to be understood that the invention is not limited to the specific embodiments thereof except as defined in the appended claims.

This application is a continuation in part of my copending applications Serial No. 225,060, filed May 7, 1951, and Serial No. 334,087, filed January 29, 1953, both now abandoned.

What is claimed is:

1. Process of preparing urea which comprises reacting together carbonyl sulfide and ammonia in the presence of methanol, heating the resulting mixture at a urea-forming temperature but below the temperature at which urea substantially decomposes, and then removing the methanol.

2. Process of preparing urea which comprises reacting together at about atmospheric pressure and room temperature carbonyl sulfide and ammonia in the presence of methanol, heating the resulting mixture in a closed vessel at a urea-forming temperature but below the temperature at which urea substantially decomposes, and then removing the methanol.

3. Process of preparing urea which comprises reacting together carbonyl sulfide and ammonia in the presence of methanol and then recovering the methanol by distillation at about atmospheric pressure.

4. Process of preparing urea which comprises reacting together at atmospheric pressure carbonyl sulfide and ammonia in the presence of methanol and then recovering the methanol by distillation at about atmospheric pressure.

5. Process of preparing urea which comprises reacting together at about room temperature carbonyl sulfide and ammonia in the presence of methanol, and subjecting the resulting reaction mixture to a temperature of about 63° C.–65° C. at about atmospheric pressure.

6. Process of preparing urea which comprises reacting together carbonyl sulfide and ammonia in the presence of methanol, a substantial excess of ammonia being employed, and then recovering the methanol by distillation at about atmospheric pressure.

7. Process of preparing urea which comprises reacting together carbonyl sulfide gas and ammonia gas in the presence of anhydrous methanol, a substantial excess of ammonia gas being employed, and then recovering the methanol by distillation at about atmospheric pressure.

8. Process of preparing urea which comprises reacting together at atmospheric pressure at about room temperature carbonyl sulfide gas and ammonia gas in the presence of anhydrous methanol, a substantial excess of ammonia gas being employed, and subjecting the resulting reaction mixture to a temperature of about 63° C.–65° C. at about atmospheric pressure.

9. Process of preparing urea which comprises mixing carbonyl sulfide gas and a substantial excess of ammonia gas with methanol at about room temperature, and subjecting the resulting mixture to a temperature of about 63° C.–65° C. at about atmospheric pressure until substantially all of the methanol has been distilled.

10. Process of preparing urea which comprises mixing carbonyl sulfide gas and a substantial excess of ammonia gas with anhydrous methanol at about room temperature and atmospheric pressure, subjecting the resulting mixture to a temperature of about 63° C.–65° C. at about atmospheric pressure until substantially all of the methanol has been distilled, and recovering the methanol and excess ammonia thus evaporated.

11. Process of preparing urea which comprises mixing ammonia gas with methanol, mixing carbonyl sulfide gas with the resulting mixture, and subjecting the thus formed mixture to a temperature of about 63° C.–65° C. at about atmospheric pressure.

12. Process of preparing urea which comprises reacting together at about atmospheric pressure and room temperature carbonyl sulfide and ammonia in the presence of methanol, heating the resulting mixture in a closed vessel at a temperature not in excess of about 140° C., and then removing the methanol.

13. Process of preparing urea which comprises reacting together at about atmospheric pressure and room temperature carbonyl sulfide and ammonia in the presence of methanol, heating the resulting mixture in a closed vessel at a temperature of about 40° C.–140° C., and then removing the methanol.

14. Process of preparing urea which comprises reacting together at about atmospheric pressure and room temperature carbonyl sulfide and ammonia in the presence of methanol, heating the resulting mixture in a closed vessel at a temperature of about 80° C.–120° C., and then removing the methanol.

15. Process of preparing urea which comprises reacting together at about atmospheric pressure and room temperature carbonyl sulfide and ammonia in the presence of methanol, the molar ratio of ammonia to carbonyl sulfide being at least about 1.8 to 1, heating the resulting mixture in a closed vessel at a temperature not in excess of about 140° C., and then removing the methanol.

16. Process of preparing urea which comprises reacting together at about atmospheric pressure and room temperature carbonyl sulfide and ammonia in the presence of methanol, the molar ratio of ammonia to carbonyl sulfide being at least about 1.8 to 1, heating the resulting mixture in a closed vessel at a temperature of about 40° C.–140° C., and then removing the methanol.

17. Process of preparing urea which comprises reacting together at about atmospheric pressure and room temperature carbonyl sulfide and ammonia in the presence of methanol, the molar ratio of ammonia to carbonyl sulfide being at least about 1.8 to 1, heating the resulting mixture in a closed vessel at a temperature of about 80° C.–120° C., and then removing the methanol.

18. Process of preparing urea which comprises reacting together at about atmospheric pressure and room temperature carbonyl sulfide and ammonia in the presence of methanol, the molar ratio of ammonia to carbonyl sulfide being at least about 3 to 1, heating the resulting mixture in a closed vessel at a temperature of about 80° C.–120° C., and then removing the methanol.

References Cited in the file of this patent
UNITED STATES PATENTS

| Number | Name | Date |
|---|---|---|
| 1,808,465 | Klemenc et al. | June 2, 1931 |

OTHER REFERENCES

Schmidt, "Ber. deut Chem.," vol. 101 (1877), pp. 191 and 192.

Klemenc, "Z Anorg. Allgemeine Chem.," vol. 191 (1930), pp. 269 and 280.

Kretzschmar, "J. Prak. Chem.," vol. 7, series 2 (1873), pp. 474–7.

Marecek, "Chemicky Obzor," vol. 23, Dec. 1948, pp. 218 and 219.